(12) United States Patent
Yabe et al.

(10) Patent No.: US 6,296,393 B1
(45) Date of Patent: Oct. 2, 2001

(54) LUBRICANT-CONTAINING POLYMER-FILLED ROLLING BEARING AND PROCESS FOR THE PRODUCTION THEREOF

(75) Inventors: Toshikazu Yabe; Nariaki Aihara; Morio Sorimachi, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/464,751

(22) Filed: Dec. 16, 1999

(30) Foreign Application Priority Data

Dec. 17, 1998 (JP) .................................................. 10-359382
Dec. 25, 1998 (JP) .................................................. 10-370549

(51) Int. Cl.$^7$ .................................................... F16C 33/66
(52) U.S. Cl. .......................... 384/463; 384/470; 508/106
(58) Field of Search ................................. 384/463, 470, 384/571; 508/106

(56) References Cited

U.S. PATENT DOCUMENTS

| | | | |
|---|---|---|---|
| 3,135,564 | * 6/1964 | Agens | 384/470 |
| 3,198,735 | * 8/1965 | Lamson et al. | 384/463 |
| 4,492,415 | * 1/1985 | Baile et al. | 384/463 |
| 5,222,816 | * 6/1993 | Kondoh et al. | 384/463 |
| 5,588,751 | 12/1996 | Nakata et al. | 384/463 |
| 5,615,956 | * 4/1997 | Oba et al. | 384/470 |
| 6,228,813 | * 5/2001 | Yabe et al. | 508/106 |

FOREIGN PATENT DOCUMENTS 55-109824 * 8/1980 (JP) ...................................... 384/463

* cited by examiner

*Primary Examiner*—Thomas R. Hannon
(74) *Attorney, Agent, or Firm*—Sughrue, Mion, Zinn, Macpeak & Seas, PLLC

(57) ABSTRACT

A lubricant-containing polymer-filled rolling bearing comprising a lubricant-containing polymer packed in the space formed by an outer race, an inner race and rolling elements, wherein the lubricant-containing polymer is packed with the interposition of a grease layer having a thickness of from 10 $\mu$m to 1,000 $\mu$m formed at least on the inner peripheral surface of the outer race, the outer peripheral surface of the inner race and the surface of the rolling elements and a lubricant-containing polymer-filled rolling bearing comprising an inner race, an outer race, a plurality of rolling elements provided between the inner race and the outer race, a cage protruding outwardly from the end face of either the inner race or the outer race and retaining the rolling elements, and a lubricant-containing polymer packed in the space formed by the inner race, the outer race, the rolling elements and the cage, wherein the cage is covered with the lubricant-containing polymer.

9 Claims, 9 Drawing Sheets

LUBRICANT-CONTAINING POLYMER-FILLED ROLLING BEARING AND PROCESS FOR THE PRODUCTION THEREOF

FIELD OF THE INVENTION

The present invention relates to a rolling bearing filled with a lubricant-containing polymer and a process for the production thereof.

BACKGROUND OF THE INVENTION

In general, the space formed by the outer race, inner race (bearing race) and rolling elements of a rolling bearing is filled with a lubricant or grease to lubricate the rolling bearing. However, such a lubricant or grease is a liquid or semisolid material that can be scattered or fluidized during the operation of the bearing. In order to prevent the scattering or fluidization of the lubricant or grease, it is arc normally practiced to seal the rolling bearing with a seal plate or the like. Therefore, it has been difficult to lubricate a small-sized bearing for special purpose with a lubricant or grease.

In order to overcome these difficulties, it has recently been proposed to fill the space formed by the inner race, outer race and rolling elements of the bearing with a polymer containing a lubricant. For example, JP-B-63-23239 (The term "JP-B" as used herein means an "examined Japanese patent application") discloses an arrangement involving the filling of the space formed by the inner race, outer race and rolling elements of a bearing with a lubricant-containing polymer comprising a grease and a polyethylene (plastic grease).

During its operation, the above proposed rolling bearing filled with a lubricant-containing polymer allows the lubricant-containing polymer to gradually release the grease as a lubricating component so that it can be lubricated over an extended period of time.

However, this kind of a lubricant-containing polymer-filled rolling bearing is disadvantageous in that since the lubricant-containing polymer normally fills the entire part of the space formed by the outer race and the inner race excluding that occupied by the rolling elements, the rotation of the rolling elements is impeded or a powder that enters into the clearance between the rolling elements and the inner race and outer race is generated during the operation of the bearing to cause so-called biting or vibration of the entire shaft, thereby resulting in the drastic deterioration of the performance of the bearing. Furthermore, there are some cases that these troubles are accompanied by the rise in the temperature of the bearing.

In order to overcome these difficulties, JP-A-8-312652 (The term "JP-A" as used herein means an "unexamined published Japanese patent application")), which corresponds to U.S. Pat. No. 5,588,751, proposes an approach involving the formation of a layer made of a lubricating component between the cage and the rolling elements prior to the packing of a lubricant-containing polymer for the purpose of preventing the lubricant-containing polymer and the rolling elements from coming in direct contact with each other.

As such a lubricant-containing polymer-filled rolling bearing there is known a deep groove ball bearing comprising an inner race and an outer race the edge face of which are flush with each other, cylindrical roller bearing, self-aligning roller bearing or the like. In order to fill such a rolling bearing with a lubricant-containing polymer, a full-pack process is normally employed which comprises packing the lubricant-containing polymer in such an arrangement that the edge face of the bearing and the lubricant-containing polymer are flush with each other.

These lubricant-containing polymer-filled rolling bearings, including ordinary deep groove ball bearing, cylindrical rolling bearing and self-aligning roller bearing, have a structure such that the edge face of the inner race and the outer race are flush with each other and the case does not protrude from the edge face of these rings and thus can be relatively easily produced in the foregoing full-pack form.

However, referring to the foregoing rolling bearing having a lubricating component layer interposed between the rings and the rolling elements, there is no specifications concerning the predetermination of the kind of lubricating component to be used and the thickness of the lubricant layer, making it occasionally impossible to obtain improvement in lubricating properties. In particular, in the case where a lubricant is used as the lubricating component, a thick layer cannot be formed to occasionally result in an insufficient effect of improving the lubricating properties.

SUMMARY OF THE INVENTION

It is therefore an object of the present invention to provide a lubricant-containing polymer-filled rolling bearing which securely allows smooth rotation over an extended period of time.

It is another object of the present invention to provide a process for the production of such a lubricant-containing polymer-filled rolling bearing.

However, unlike the foregoing ordinary lubricant-containing polymer-filled rolling bearing, a rolling bearing having a structure such that the vertical (crosswise) thickness of the inner race and the outer race differ from each other and the cage protrudes from the edge face of the inner race or outer race, that is, the axial edge face of the inner race and the outer race are not flush with each other, i.e., tapered roller bearing or the like, can be hardly produced in a form corresponding to the foregoing full-pack form by, e.g., by means of a simple method which includes heat-forming components sandwiched between flat plates.

Accordingly, it has been practically difficult to provide a lubricant-containing polymer-filled rolling bearing having such a structure.

It is therefore a further object of the present invention to provide a lubricant-containing polymer-filled rolling bearing comprising a cage covered with a lubricant-containing polymer which can be produced by a simple method even in the form of a rolling bearing having a structure such that the vertical thickness of the inner race and the outer race differ from each other and the cage protrudes from either one of the edge face of the inner race and the outer race.

It is a still further object of the present invention to provide a process for the production of such a rolling bearing.

These and other objects of the present invention will become apparent from the following detailed description and examples.

These and other objects of the present invention are accomplished with a lubricant-containing polymer-filled rolling bearing comprising a lubricant-containing polymer packed in the space formed by an outer race, an inner race and rolling elements, wherein the lubricant-containing polymer is packed with the interposition of a grease layer having a thickness of from 10 $\mu$m to 1,000 $\mu$m formed at least on the inner peripheral surface of the outer race, the outer peripheral surface of the inner race and the surface of the rolling elements.

These and other objects of the present invention are accomplished with a process for the production of a lubricant-containing polymer-filled rolling bearing, which comprises assembling a rolling bearing, forming a grease layer having a thickness of from 10 $\mu$m to 1,000 $\mu$m on at least the inner peripheral surface of an outer race, the outer peripheral surface of an inner race and the surface of rolling elements, filling the space formed by the outer race, the inner race and the rolling elements with a lubricant-containing polymer, and then allowing the lubricant-containing polymer to solidify.

The lubricant-containing polymer-filled rolling bearing according to the present invention comprises a layer composed of a grease having a predetermined thickness of from 10 $\mu$m to 1,000 $\mu$m to have assured improvement in lubricating properties. The use of a grease makes it possible to form a layer having a thickness as great as about 1,000 $\mu$m that allows a great clearance between the lubricant-containing polymer and the rolling elements or the outer and inner races and hence assures smooth rotation.

These and other objects of the present invention are accomplished with a lubricant-containing polymer-filled rolling bearing comprising a pair of races, i-e., inner race and outer race, a plurality of rolling elements provided interposed between the inner race and the outer race, a cage protruding outwardly from the end face of either the inner race or the outer race and retaining the rolling elements, and a lubricant-containing polymer packed in the space formed by the inner race, the outer race, the rolling elements and the cage, wherein the cage is covered with the lubricant-containing polymer.

The lubricant-containing polymer-filled rolling bearing having the foregoing structure allows the lubricant-containing polymer to act not only as a lubricant-supplying member but also as a seal against the entrance of foreign matters such as water and thus exhibits an enhanced reliability.

The rolling elements to be incorporated in the lubricant-containing polymer-filled rolling bearing according to the present invention can be also in the form of tapered roller.

The present invention also provides a process for the production of a lubricant-containing polymer-filled rolling bearing comprising an inner race, an outer race, a plurality of rolling elements provided interposed between the inner race and the outer race, a cage protruding outwardly from the end face of either the inner race or the outer race and retaining the rolling elements, and a lubricant-containing polymer packed in the space formed by the inner race, the outer race, the rolling elements and the cage, which comprises steps of:

assembling a rolling bearing and applying a release agent or grease to the outer peripheral surface of the inner race, the inner peripheral surface of the outer race, the surface of the rolling elements and the surface of the cage;

placing the rolling bearing to which a release agent or grease has been applied between a lower fixture arranged such that it comes in contact with the wider end face of the inner race but does not come in contact with the narrower end face of the outer race and the cage and an upper fixture arranged such that it comes in contact with the wider end face of the outer race but does not come in contact with the narrower end face of the inner race and the cage; and solidifying the lubricant-containing polymer packed in the space formed by the inner race, the outer race, the rolling elements and the cage.

BRIEF DESCRIPTION OF THE DRAWINGS

By way of example and to make the description more clear, reference is made to the accompanying drawings in which.

DETAILED DESCRIPTION OF THE INVENTION

The present invention will be further described hereinafter in connection with the attached drawings.

The present invention can be applied to various rolling bearings.

Figure 1:
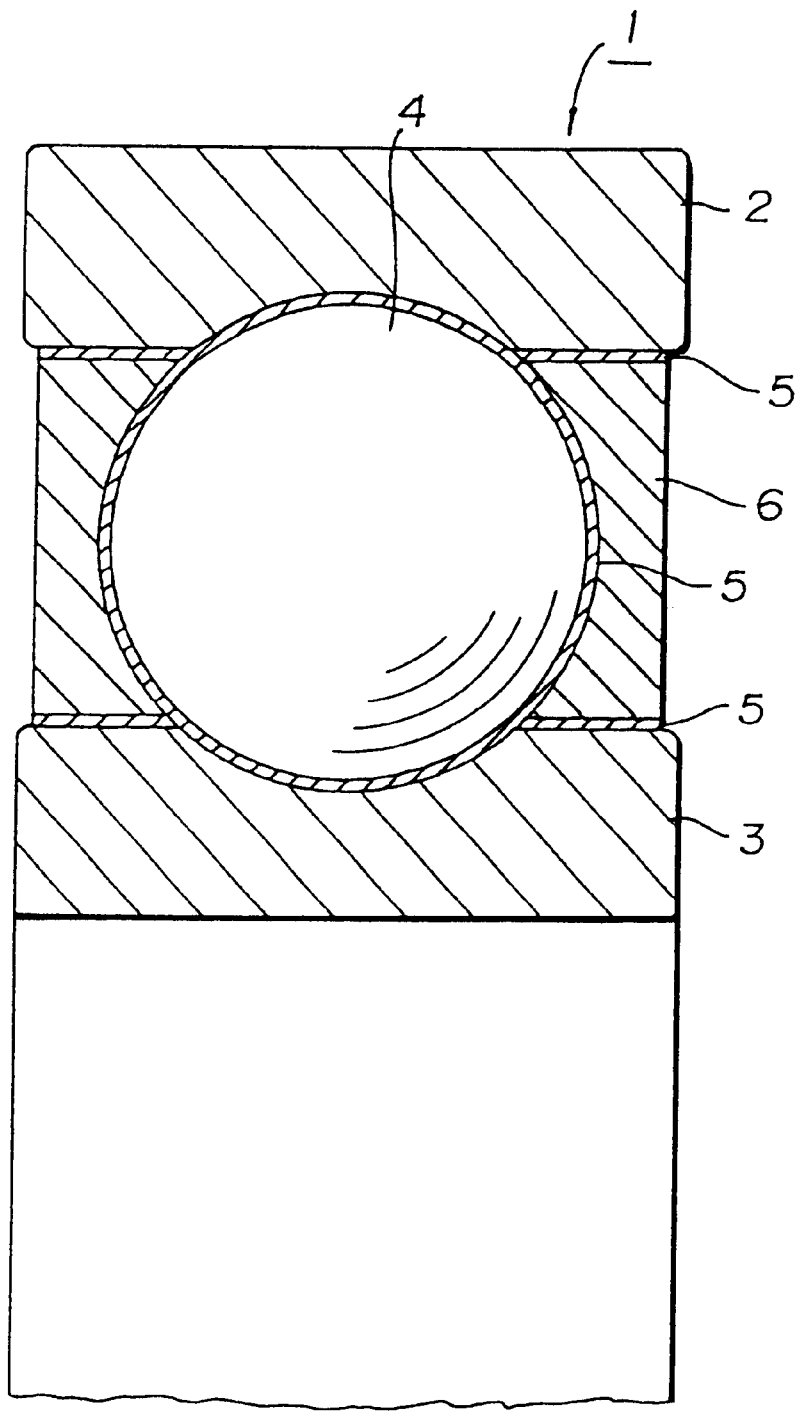
FIG. 1 is a sectional view of essential part illustrating an embodiment (ball bearing) of the lubricant-containing polymer-filled rolling bearing according to the present invention.

For example, FIG. 1 is a sectional view illustrating a ball bearing. A ball bearing 1 comprises an outer race 2, an inner race 3, a ball 4 as a rolling element, a grease layer 5 formed on the inner peripheral surface of the outer race 2, the outer peripheral surface of the inner race 3 and the surface of the ball 4, and a lubricant-containing polymer 6 packed in the space formed by the outer race 2, the inner race 3 and the ball 4 on which the grease layer 5 is formed.

In this arrangement, the presence of the grease layer 5 allows the lubricant-containing polymer 6 to prevent itself from coming in direct contact with the outer race 2, the inner race 3 and the ball 4 and hence inhibiting the rotation of the ball 4 or the like. Further, since the grease layer 5 is formed also in the clearance between the ball 4 and the outer race 2 and inner race 3, the entrance of a powder generated by the abrasion of the lubricant-containing polymer 6 into the clearance can be prevented. Moreover, the lubricant-containing polymer 6 allows its constituent lubricating component to be gradually release with the operation of the ball bearing 1 to keep the ball bearing 1 lubricated over an extended period of time.

Thus, the interposition of the grease layer 5 between the lubricant-containing polymer 6 and the constituent members of the ball bearing 1 makes it possible for the ball bearing 1 to allow smooth rotation at a low torque over an extended period of time.

Figure 2:
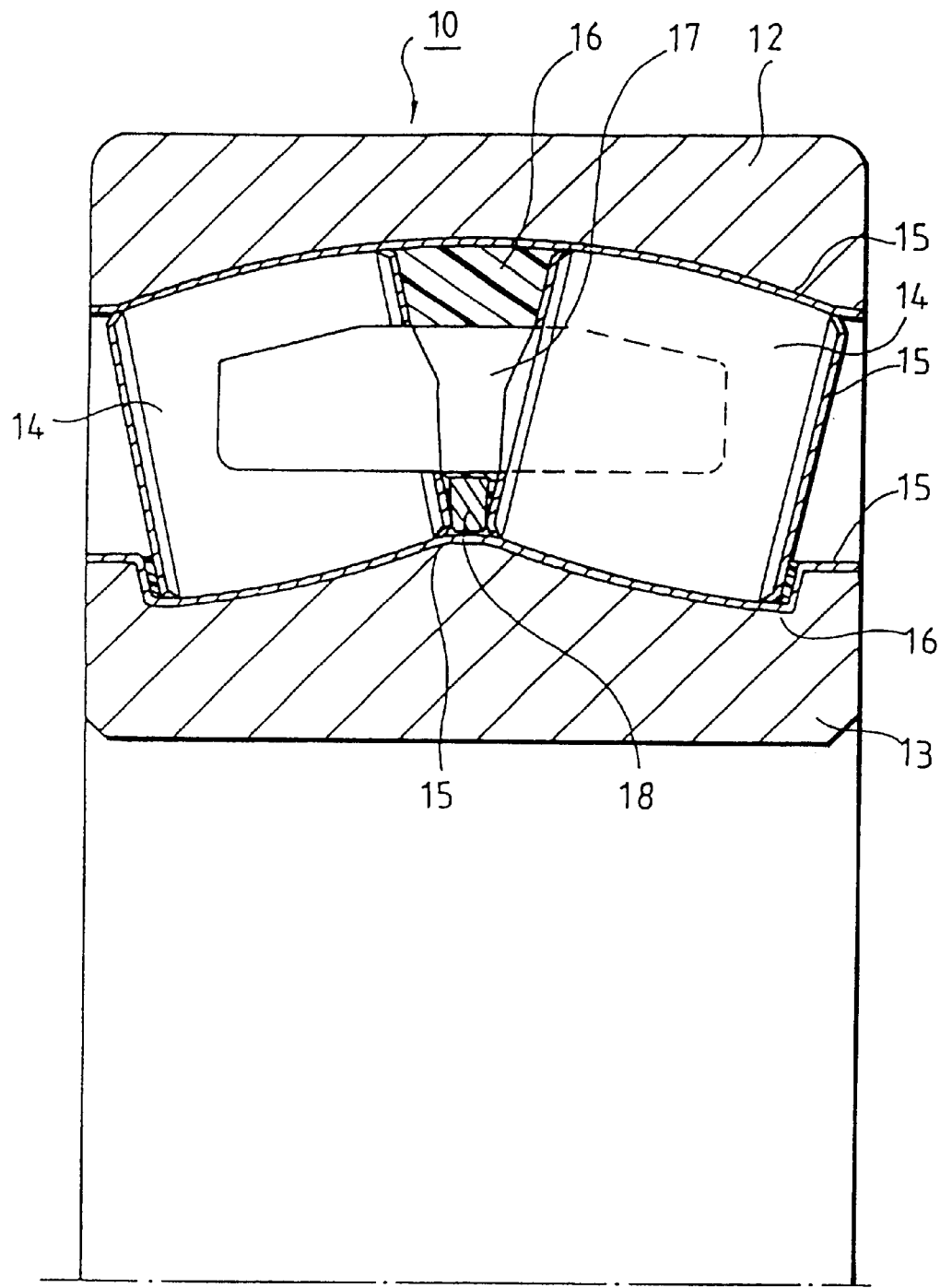
FIG. 2 is a sectional view of essential part illustrating another embodiment (self-aligning roller bearing) of the lubricant-containing polymer-filled rolling bearing according to the present invention.

The present invention can be applied also to a self-aligning roller bearing 10 as shown in FIG. 2. The self-aligning roller bearing 10 comprises as a rolling element a roller 14 arranged such that it can be self-aligned. In this arrangement, the entire bearing can be self-aligned.

In some detail, the self-aligning roller bearing 10 comprises two series of barrel-shaped rollers 14 located radially alternately, each retained by a cage 17 integrated therewith, between the inner race 13 and the outer race 12, and a guide race 18 for guiding the roller 14 disposed, coaxially with the cage 17, between the cage 17 and the inner race 13.

The self-aligning roller bearing 10 further comprises a grease layer 15 formed on the outer peripheral surface of the inner race 13, the inner peripheral surface of the outer race 12 and the surface of the roller 14 and the guide race 18 and a lubricant-containing polymer 16 packed in the space formed by the inner race 13 and the outer race 12, the clearance between the inner race 13 and the roller 14 and the clearance between the inner end face of the roller 14 and the guide race 18.

In general, the self-aligning roller bearing 10 suffers from the rise in the bearing torque or the rise in the temperature of the bearing developed when the inner end face of the roller 14 comes in sliding contact with the guide race 18. In the present invention, however, the grease layer 15 is formed also on the surface of the roller 14 and the guide race 18 to reduce the contact resistance, making it possible to effectively inhibit the rise in the bearing torque or the rise in the temperature of the bearing.

The method for packing the lubricant-containing polymer 6, 16 is not specifically limited. In practice, however, injection molding method is preferably used. The reason will be described hereinafter.

In the present invention, the formation of the grease layer on the surface of the rolling elements, inner race and outer race is followed by the packing of the lubricant-containing polymer. In this procedure, if the compatibility of the lubricant-containing polymer with the grease is too high, the molten resin in the lubricant-containing polymer can take the grease therein and cause solidification. Thus, if it takes much time to pack the lubricant-containing polymer, the amount of the grease to be taken in by the molten resin increases, causing defects such as unevenness and a reduced thickness of the grease layer after solidification. of the lubricant-containing polymer. As compared with other methods, injection molding method allows the lubricant-containing polymer to be packed into the entire space in a short period of time, making it possible to minimize the amount of the grease to be taken in by the molten resin.

Further, injection molding method provides some extrusion pressure that pushes a part of the grease into the corners of the space to form a pool of grease. As a result, the pool of grease gradually releases grease with the operation of the bearing to keep the bearing lubricated over a prolonged period of time.

Figure 3:
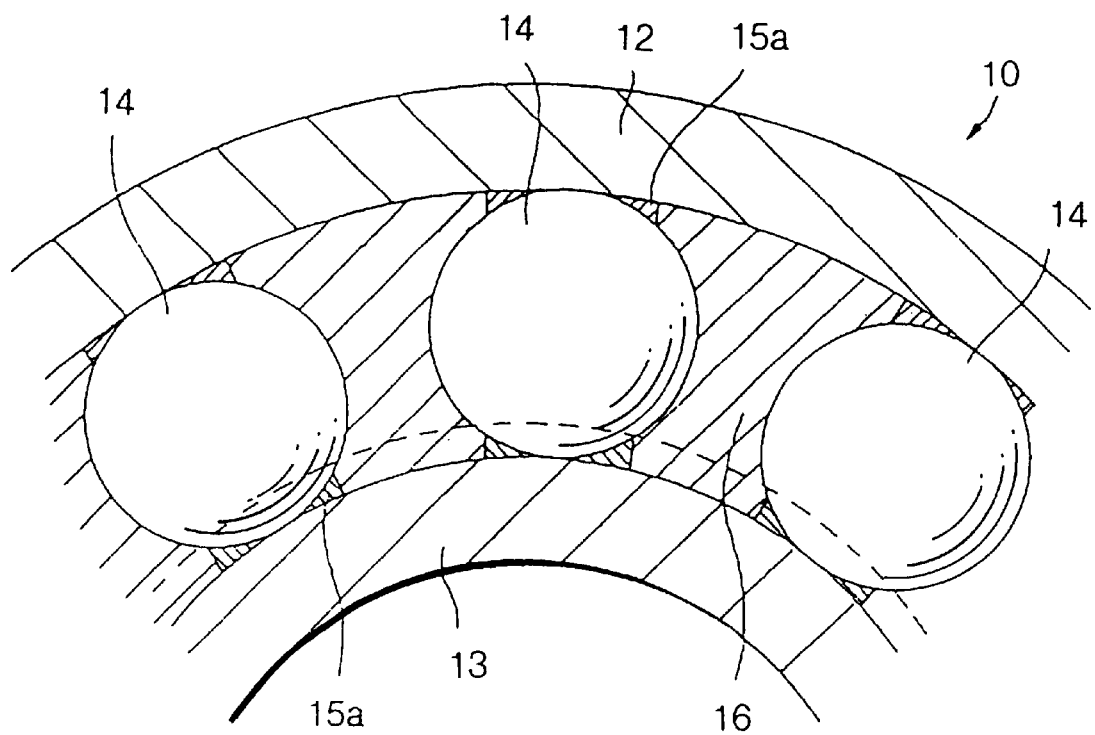
FIG. 3 is a diagram (partial) as viewed from the end face side of the self-aligning roller bearing of FIG. 2.

FIG. 3 is a diagram of the self-aligning roller bearing 10 of FIG. 2 viewed from the end face side thereof (For simplification, the collar of the inner race is indicated by the broken line). As the lubricant-containing polymer 16 is packed into the bearing by injection molding method, a part of the grease layer formed on the surface of the roller 14 moves to the corners of the space, making it possible to form a pool of grease 15a as well as prevent the lubricant-containing polymer from forming an edge portion between the side face of the roller 14 and the inner race 13 and outer race 12. The absence of the edge portion makes it possible to prevent the inclusion of edge portion between the outer race 13 and inner race 12 and the side face of the roller 14 that causes the destruction of the bearing or the rise in the temperature of the bearing.

Figure 4:
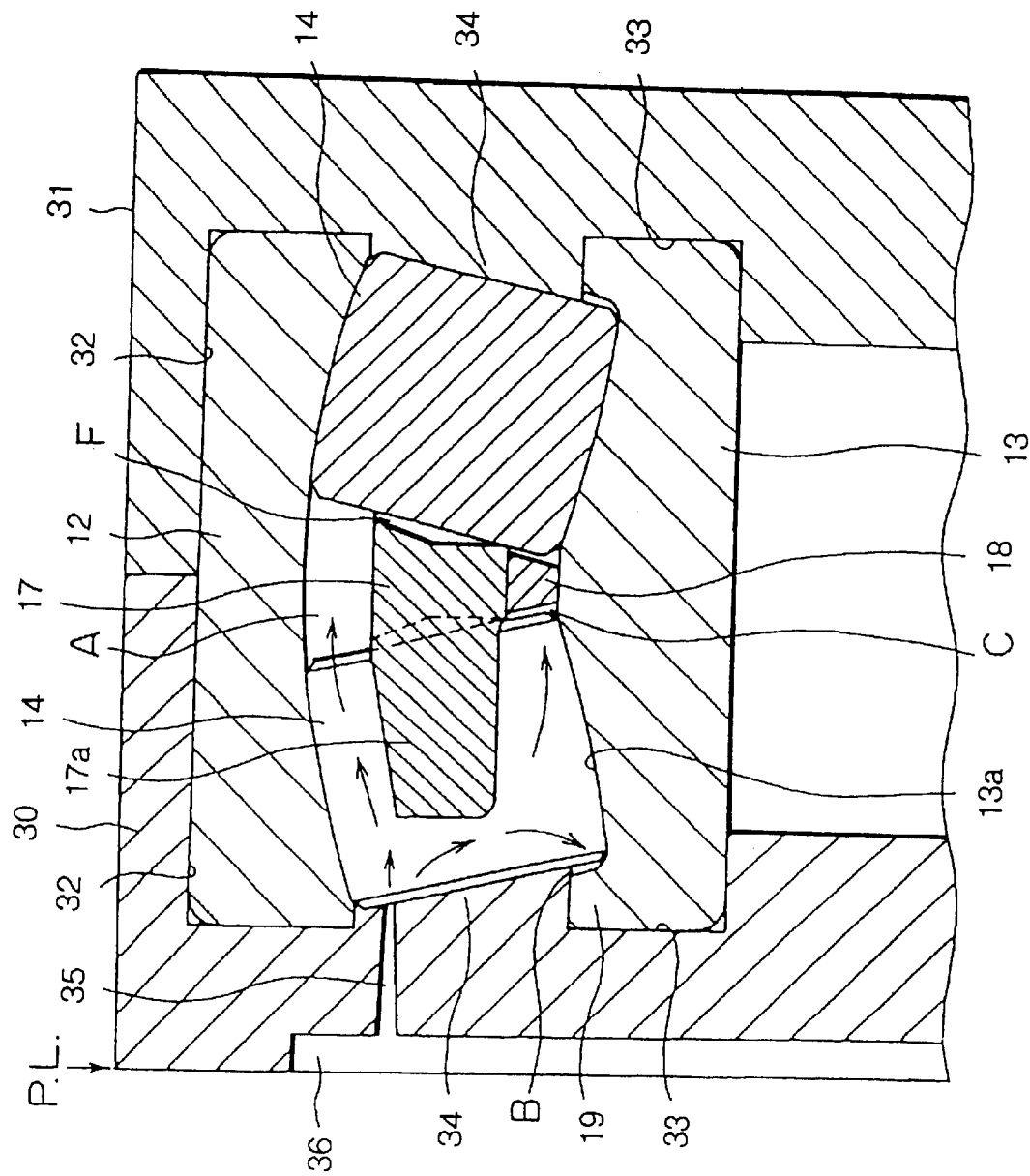
FIG. 4 is a diagram illustrating the process of packing a lubricant-containing polymer by injection molding method.
Figure 5:
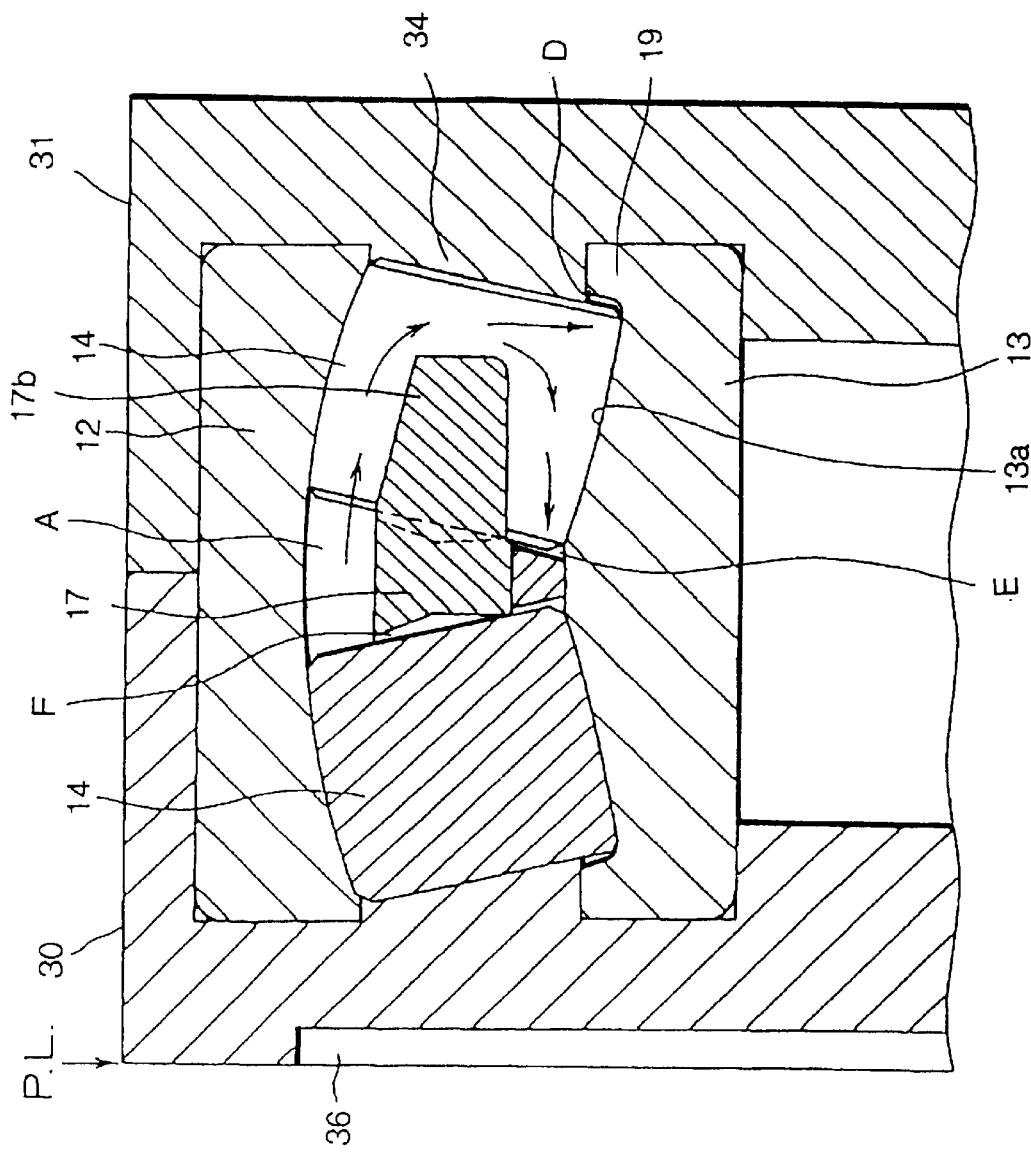
FIG. 5 is a diagram illustrating the process of packing a lubricant-containing polymer by injection molding method.

For injection molding method, a mold consisting of two horizontal divisions 30, 31 as shown in FIGS. 4 and 5 is used. The two divisions 30, 31 each comprise a concave portion 32 in which the outer race 12 fits, a concave portion 33 in which the inner race 13 fits and a collar portion 34 which externally fits in the clearance between the inner race 13 and the outer race 12. The collar portion 34 consists of surface along the outer end face of the roller 14, surface along the periphery of a collar 19 for preventing the falling of the inner race 13 and surface along the inner peripheral surface of the outer race 12 outside the groove.

Accordingly, the mold is arranged such that when the divisions 30, 31 are combined together to allow the collar portion 34 of the divisions 30, 31 to fit in the clearance between the inner race 13 and the outer race 12 until the forward end thereof comes in contact with the outer end face of the roller 14, the various surfaces of the collar portion 34 are brought into contact with the respective surface of the bearing so that the outer peripheral surface and the side surface of the outer race 12 fit in the concave portion 32 and the inner peripheral surface and the side surface of the inner race 13 fit in the concave portion 33.

Further, the collar portion 34 of the other division 30 is provided with a gate 35. The gate 35 is a pin point gate. The gates 35 are provided, along by the outer circumferential line of the annular portion of cage 17, at intervals corresponding to that of the rollers 14 in the series of rollers in the same number as that of the rollers 14 in the series of rollers. The division 30 is mounted in such an arrangement that the gates 35 are each positioned corresponding to the clearance between the adjacent rollers 14 in the series of rollers which is on the side at which the division 30 is mounted (left series of rollers as viewed on the drawing).

The root end of the gates 35 are each connected to a disc-shaped runner 36. A sprue (not shown) is provided at the position corresponding to the center of the axis of the bearing outside the parting line (P.L.) of the mold. In this arrangement, the lubricant-containing polymer which has been introduced into the runner 36 through the sprue of the mold from the injection molding machine is radially spread to all the gates 35 from which it is then introduced into the bearing. The lubricant-containing polymer then moves through the interior of the bearing as indicated by the arrow in FIGS. 4 and 5.

In some detail, as shown in FIG. 4, the lubricant-containing polymer enters through the forward end of the gate 35 into the clearance between the adjacent rollers 14 in the left series. One part of the lubricant-containing polymer moves through the clearance between a left retaining portion 17a and the outer race 12 to the space A between the annular portion of the cage 17 and the outer race 12. The other part of the lubricant-containing polymer moves through the clearance between the outer end face of the retaining portion 17a of the cage 17 and the collar portion 34 of the mold. One part of the other flow of lubricant-containing polymer enters into the space B between the inner peripheral surface of the collar 19 for preventing falling of the inner race 13 and the outer peripheral surface of the roller 14. The other part moves through the clearance between the retaining portion 17a and the groove 13a of the inner race 13 into the space C between the guide race 18 and the inner end face of the roller 14.

The molten lubricant-containing polymer which has reached the space A enters into the clearance between the adjacent rollers 14 in the right series as viewed in FIG. 5, and then moves through the clearance between the right retaining portion 17b of the cage 17 and the outer race 12. One part of the molten lubricant-containing polymer moves through the clearance between the outer end face of the retaining portion 17b and the collar portion 34 of the mold into the space D between the collar portion 34 and the collar 19 for preventing falling of the inner race 13. The other part of the molten lubricant-containing polymer moves through the clearance between the retaining portion 17b and the groove 13a of the inner race 13 into the space E between the guide race 18 and the inner end face of the roller 14. The molten lubricant-containing polymer which has reached the space A then also enters into the space F between the inner end face of the roller 14 and the annular portion of the cage 17.

The foregoing injection molding is preferably accomplished by the use of the injection molding machine described in JP-A-8-309793.

When the mold is removed from the bearing which has thus been subjected to injection molding, a self-aligning roller bearing 10 comprising a grease layer 15 formed on the surface of the outer race 12, the inner race 13 and the rollers 14 and a solidified lubricant-containing polymer 16 packed in the inner space of the bearing, i.e., the foregoing spaces A to F and clearance between the adjacent rollers 14 as shown in FIG. 2 can be obtained.

If the lubricant-containing polymer used exhibits a low compatibility with the grease constituting the layer, the method for packing the lubricant-containing polymer is not limited to the fore going injection molding method. For example, a so-called heat-forming method can be used which packing an unsintered lubricant-containing polymer into the inner space of the bearing the interior of which has been coated with a grease, heat-fusing the lubricant-containing polymer, and then cooling the material so that it is solidified.

Figure 6:
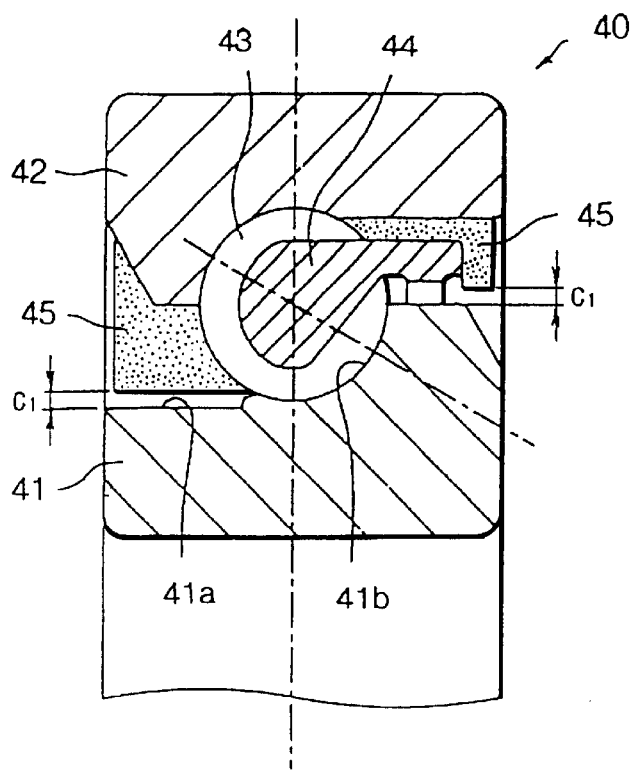
FIG. 6 is a sectional view of essential part of a further embodiment (angular contact ball bearing) of the lubricant-containing polymer-filled rolling bearing according to the present invention.

The present invention can be also applied to an angular contact ball bearing having a structure as shown in FIG. 6.

In some detail, an angular contact ball bearing 40 comprises a ball 43 retained by a helmet-shaped cage 44 at a predetermined contact angle between an inner race 41 and an outer race 42, a grease layer (not shown) formed on the surface of the ball 43, and a lubricant-containing polymer 45 packed in the space around the ball 43. The lubricant-containing polymer 45 is packed in such an arrangement that a clearance C1 (e.g., 0.5 mm) is formed against the inner race 41.

Figure 7:
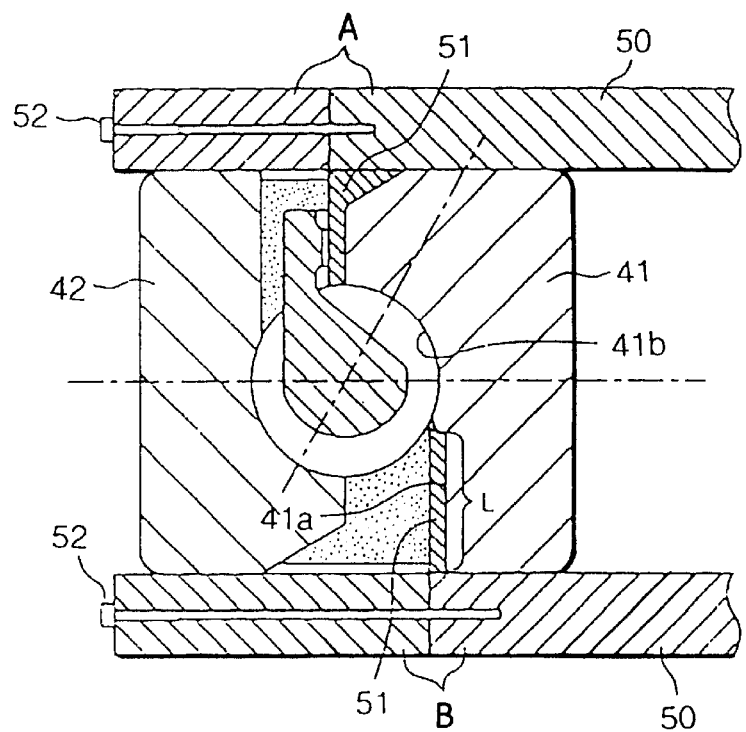
FIG. 7 is a diagram illustrating the process for preparing the angular contact ball bearing of FIG. 6, wherein the reference numeral 1 indicates a ball bearing, the reference numeral 2 indicates an outer race, the reference numeral 3 indicates an inner race, the reference numeral 4 indicates a ball, the reference numeral 5 indicates a grease layer, the reference numeral 6 indicates a lubricant-containing polymer, the reference numeral 10 indicates a self-aligning roller bearing, the reference numeral 12, indicates an outer race, and the reference numeral 13 indicates an inner race.

The angular contact ball bearing 40 is produced using fixtures A and B as shown in FIG. 7. The fixtures A and B each have a spacer block 50 provided with a vertically protruding clearance-forming ring protrusion 51 on the side thereof which comes in contact with the side face of the inner race 41 and the outer race 42, respectively. The protruding length L of the ring protrusion 51 is almost the same as length between the end face (side face) at the outer peripheral surface 41a and the side face of the groove 41b of the inner race 41. The clearance C1 is adjusted by the thickness of the ring protrusion 51. The spacer block 50 is formed by integrally connecting a flat plate to the plate from which the clearance-forming ring protrusion 51 protrudes with a fixing screw 52. In order to effect molding, an unsintered lubricant-containing polymer is packed into the bearing in such an arrangement that the fixture B is disposed below the bearing. The lubricant-containing polymer is then heat-molded.

In the foregoing various rolling bearings, the grease can form a thick layer because it is semi-solid. In the present invention, the grease layer preferably has a thickness of from 10 $\mu$m to 1,000 $\mu$m. If the thickness of the grease layer falls below 10 $\mu$m, the resulting effect of prolonging the lubricating life is insufficient. The thickness of the grease layer is preferably greater within the above formed range to secure clearance for smooth rotation or from the standpoint of lubricating life. However, if the thickness of the grease layer exceeds 1,000 $\mu$m, the clearance between the lubricant-containing polymer and the various members of the bearing (e.g., inner peripheral surface of the outer race, outer peripheral surface of the inner race) becomes greater than required, deteriorating the sealability of the bearing with respect to foreign matters such as dust and water to disadvantage. If the amount of the grease with which the interior of the bearing is coated is too great, part of the grease which has been pushed out by injection molding occupies more the inner space of the bearing, if produced by injection molding. As a result, in the bearing shown in FIG. 2, for example, the space between the outer end face of the rollers 14 cannot be fully occupied by the lubricant-containing polymer 16, occasionally making it more likely that malpacking occurs resulting in the exposure of the cage or like defects.

The method for forming the grease layer is not specifically limited. For example, a method may be employed which comprises packing a small amount of a grease into the bearing, and then rotating the shaft so that a grease layer is formed on the inner peripheral surface of the outer race, the outer peripheral surface of the inner race, the surface of the rolling elements, and optionally the surface of the cage. Another method comprises dissolving a grease in a solvent capable of dissolving its base oil therein and uniformly dispersing a thickening agent therein in an appropriate concentration, dipping the bearing in the solution, and then drying the bearing to remove the solvent therefrom, thereby forming a grease layer thereon.

The formation of the grease layer is preferably preceded by the degreasing/cleaning of the bearing.

In the present invention, the material of the grease layer and the lubricant-containing polymer are not specifically limited. Preferred examples of these materials will be described hereinafter. The lubricant-containing polymer to be used herein is a solid material obtained by a process which comprises mixing a synthetic resin selected from the group consisting of polyolefinic resins having the same chemical structure such as polyethylene, polypropylene, polybutyrene and polymethylpentene with as a lubricant paraffin-based hydrocarbon oil such as-poly-α-olefin oil, naphthene-based hydrocarbon oil, mineral oil, ether oil such as dialkyldiphenylether oil and ester oil such as phthalic acid ester, singly or in admixture, heating the starting material thus prepared to a temperature of not lower than the melting point of the resin to plasticize the resin, and then cooling the material so that it is solidified. The lubricant may previously comprise various additives such as oxidation inhibitor, rust preventive, abrasion inhibitor, anti-foaming agent and extreme-pressure additive incorporated therein.

Referring to the formulation of the foregoing lubricant-containing polymer, the proportion of the polyolefin-based resin and lubricant are from 10 to 50% by weight and from 90 to 50% by weight, respectively. If the proportion of the polyolefin-based resin falls below 10% by weight, the resulting hardness and strength of the lubricant-containing polymer cannot reach the predetermined level, making it difficult to maintain the initial shape under a load developed by the rotation of the rolling bearing and hence making it more likely that the lubricant-containing polymer can fall off the inner space of the bearing. On the contrary, if the proportion of the polyolefin-based resin exceeds 50% by weight (if the proportion of the lubricant falls below 50% by weight), the amount of the lubricant to be supplied into the bearing decreases, shortening the life of the bearing.

The foregoing group of synthetic resins have the same basic structure but have different average molecular weights ranging from 700 to $5 \times 10^6$. In practical use, those classified as wax having an average molecular weight of from 700 to $1 \times 10^4$ (e.g., polyethylene wax), those having a molecular weight of as relatively low as $1 \times 10^4$ to $1 \times 10^6$ as calculated in terms of average molecular weight and those having a molecular weight of as very high as $1 \times 10^6$ to $5 \times 10^6$ as calculated in terms of average molecular weight may be used singly or in admixture as necessary.

For example, the combination of a resin having a relatively low molecular weight and a lubricant makes it possible to obtain a lubricant-containing polymer having some mechanical strength, lubricant-supplying capacity and oil retention. Further, the replacement of a part of the resin having a relatively low molecular weight by one classified as wax results in the enhancement of the oil retention of the lubricant-containing polymer, making it possible to supply the lubricant into the bearing over an extended period of time, because the resin classified as wax exhibits a small difference in molecular weight from the lubricant and thus exhibits a high affinity for the lubricant. However, the mechanical strength of the lubricant-containing polymer is reduced instead. As the wax there may be used a polyolefin-based resin such as polyethylene wax. Alternatively, any hydrocarbon resin having a melting point of from 100° C. to 130° C. (e.g., paraffin-based synthetic resin) may be used. On the contrary, if a part of the resin having a relatively low molecular weight is replaced by one having a very high molecular weight, the resulting lubricant-containing polymer exhibits a deteriorated oil retention, allowing the lubricant to ooze out from the lubricant-containing polymer at a higher rate, because the resin having a very high molecular weight has a great difference in molecular weight from the lubricant and thus exhibits a reduced affinity for the lubricant. Accordingly, the time required until the limit of the amount of the lubricant that can be supplied from the lubricant-containing polymer is reached is reduced, shortening the life of the bearing. However, the mechanical strength of the lubricant-containing polymer is enhanced.

Taking into account the balance of moldability, mechanical strength, oil retention and lubricant-supplying capacity, a practically preferred formulation of the lubricant-containing polymer comprises a resin component classified as wax in a proportion of from 0 to 5% by weight, a resin component having a relatively low molecular weight in a proportion of from 8 to 48% by weight and a resin component having an ultra-high molecular weight of from 2 to 15% by weight, with the proviso that the sum of the proportion of the three resin components is from 10 to 50% by weight (balance (90 to 50% by weight) of a lubricant).

Referring to the index of mechanical strength of the lubricant-containing polymer, the hardness [$HD_A$ (durometer hardness on Scale A)] of the lubricant-containing polymer is preferably from 65 to 85, more preferably from 70 to 80. If the hardness [$HD_A$] of the lubricant-containing polymer falls below 65, the resulting lubricant-containing polymer exhibits too low a strength and thus may break when the bearing operates. On the contrary, if the hardness [$HD_A$] of the lubricant-containing polymer exceeds 85, the force by which the rolling elements are caught is too strong, causing the rise in the bearing torque or the rise in heat generation during rotation and hence possibly causing the rise in the temperature of the bearing.

In order to enhance the mechanical strength of the lubricant-containing polymer, the foregoing polyolefin-based resin may comprise the following thermoplastic resin and thermosetting resin incorporated therein.

Examples of the thermoplastic resin employable herein include various resins such as polyamide, polycarbonate, polybutyrene terephthalate, polyphenylene sulfide, polyether sulfone, polyether ether ketone, polyamideimide, polystyrene and ABS resin.

Examples of the thermosetting resin employable herein include various resins such as unsaturated polyester resin, urea resin, melamine resin, phenolic resin, polyimide resin and epoxy resin.

These resins may be used singly or in admixture.

In order to enhance similarly the mechanical strength of the lubricant-containing polymer, the lubricant-containing polymer may comprise a filler incorporated therein. Examples of the filler employable herein include inorganic whiskers such as calcium carbonate whisker, magnesium carbonate whisker, potassium titanate whisker and aluminum borate whisker, inorganic fibers such as glass fiber, metallic fiber and carbon fiber, cloth obtained by knitting these inorganic fibers, inorganic powders such as carbon black and graphite powder, organic fibers such as aramide fiber and polyester fiber, and cloth obtained by knitting these organic fibers.

In order to allow the polyolefin-based resin and other resins to be dispersed more uniformly, the lubricant-containing polymer may comprise an appropriate compatibilizing agent incorporated therein as necessary.

For the purpose of inhibiting the thermal deterioration of the polyolefin-based resin, the lubricant-containing polymer may comprise an aging inhibitor such as N,N'-diphenyl-p-phenyldiamine and 2,2'-methylenebis(4-ethyl-6-t-butylphenol) incorporated therein. For the purpose of inhibiting the photo-deterioration of the polyolefin-based resin, the lubricant-containing polymer may comprise an ultraviolet absorber such as 2-hydroxy-4-n-octoxybenzophenone and 2-(2'-hydroxy-3'-t-butyl-5'-methyl-phenyl)-5-chlorobenzotriazole incorporated therein.

The total added amount of the additives other than the foregoing polyolefin-based resin and lubricant is preferably not more than 20% by weight based on the total weight of the starting material to be molded from the standpoint of the maintenance of the lubricant-supplying capacity.

As the polymer material to be used herein there may be used one based on the foregoing polyolefin-based resin.

Alternatively, any injection-moldable thermoplastic resin may be used. Among these thermoplastic resins, one capable of retaining more oil is a polyester-based elastomer.

Besides the thermoplastic. resin, an injection-moldable thermosetting resin such as polyurethane and polyurea elastomer may be used. If such a polyurethane is used, a grease is used as a lubricant. The grease is then uniformly mixed with each or either one of an urethane polymer having an isocyanate group and an amine hardener as reaction starting materials. The two mixtures are further mixed. The mixture is then packed into the bearing. The mixture with a grease incorporated therein is then cured optionally by reaction under heating. If the polyurea is used, an amine component made of a mixture of an aromatic polyamine compound containing a soft segment in its molecular chain and an aromatic diamine is uniformly mixed with a lubricant compatible therewith or a grease having such a lubricant as a base oil. The mixture is then mixed with a polyisocyanate component. The mixture is then packed into a bearing having a desired shape The mixture is then cured with a lubricant incorporated therein optionally by reaction under heating.

On the other hand, the kind of the grease to be used herein is not limited. In practice, however, the grease to be used herein is preferably selected taking into account its affinity for the resin and lubricant constituting the foregoing lubricant-containing polymer.

As mentioned above, in the present invention, the lubricant-containing polymer once becomes molten when packed into the bearing. During this procedure, the resin and the lubricant constituting the lubricant-containing polymer are kept compatibilized with each other. Thus, the resin is kept capable of taking in the most other components compatible with each other. Accordingly, if the grease layer formed on the surface of the rolling elements is compatible with the resin, the grease is taken in by the molten resin, making itmore likely that the lubricant-containing polymer is solidified in contact with the rolling elements. As a result, the rotation of the rolling elements is inhibited, occasionally making it difficult to fully exert an effect of lessening the torque by the grease layer similar to the foregoing release agent.

Accordingly, the combination of the resin and lubricant constituting the lubricant-containing polymer and the grease to be used herein is preferably arranged such that they have a low compatibility with each other.

For example, if the resin constituting the lubricant-containing polymer is a polyolefin-based resin such as polyethylene, which is a hydrocarbon having a low polarity, the lubricant which can be singly incorporated in a high concentration is preferably a hydrocarbon-based compound similarly having a relatively low polarity, such as mineral oil, poly-α-olefin oil, phenylether having a long hydrocarbon chain (e.g., octadecyldiphenylether) and naphthalene having a long hydrocarbon chain (e.g., eicosil naphthalene). Accordingly, if the lubricant-containing polymer comprises a hydrocarbon compound having a low polarity, the grease constituting the layer is most preferably a fluorine-based grease (thickening agent: PTFE, base oil: perfluoropolyether), silicone grease (thickening agent: lithium soap, base oil: phenylmethyl polysioloxane, dimethyl polysioxane) or fluorosilicone grease (thickening agent: lithium soap, base oil: fluorosilicone), which is little compatible with hydrocarbon-based compounds., Further, a grease which is hydrocarbon-based but has a high polarity and hence a low compatibility with the resin, such as ester grease comprising an ester oil as a base oil (thickening agent: urea, lithium soap, etc.) and polyphenylether-based grease comprising polyphenylether such as pentaphenylether-tetraphenylether as a base oil (thickening agent: bentonite, etc.) can be used.

If the resin constituting the lubricant-containing polymer is a hydrocarbon-based compound having a high polarity such as polyester-based elastomer, polyurea elastomer and polyurethane, the foregoing grease having little compatibility with hydrocarbon-based compounds such as fluorine-based grease, silicon grease and fluorosilicone grease is most preferred. Examples of the hydrocarbon-based grease include those having a low compatibility which comprise mineral oil having a low polarity, poly-α-olefin oil, a phenylether having a long hydrocarbon chain such as octadecyldiphenylether, or a naphthalene having a long hydrocarbon chain such as eicosil naphthalene as a basic oil and urea, lithium soap or the like as a thickening agent.

As mentioned above, the lubricant-containing polymer-filled rolling bearing of the present invention comprises a grease layer formed on the surface of the rolling elements, the inner race and the outer race. The grease layer is then kept interposed between the surface of the rolling elements, the inner race and the outer race and the lubricant-containing polymer after packing and solidification of the polymer. In this arrangement, the rolling elements cannot be caught by the lubricant-containing polymer and thus can smoothly rotate at a low torque, giving less heat generation due to the rotation of the shaft and hence allowing use at a higher speed.

Further, if the lubricant-containing polymer exhibits a low compatibility with the grease, the grease can be little taken in by the grease during the packing of the lubricant-containing polymer, making it possible to form a grease layer having a greater thickness and homogeneity.

The production of the lubricant-containing polymer-filled rolling bearing having a cage according to the present invention can be accomplished by the use of a special fixture consisting of a lower fixture and an upper fixture capable of spacking and solidifying a lubricant-containing polymer in such a manner that the cage is covered thereby. As the lubricant-containing polymer to be used herein there can be used the same material as described above.

The foregoing lower fixture is arranged such that it does not come in contact with the end face of the outer race and the cage. A clearance of from about 0.1 to 0.5 mm is preferably formed with respect to the end face of the outer race. Further, a clearance of from about 0.5 to 2 mm is preferably formed with respect to the cage.

On the other hand, the foregoing upper fixer is arranged such that it does not come in contact with the end face of the inner race and the cage. A clearance of from about 0 1 to 0.5 mm is preferably formed with respect to the end face of the inner race. Further, a clearance of from about 0.5 to 2 mm is preferably formed with respect to the cage.

For the production of the lubricant-containing polymer-filled rolling bearing according to the present invention, heat molding, injection molding (insertmolding) or the like can be used.

If heat molding is used, the following method can be used.

After the application of the foregoing release agent or grease, a lubricant-containing polymer is then packed into the space formed by the foregoing inner race, outer race, rolling elements and cage. Subsequently, the rolling bearing is placed on the predetermined position in the foregoing lower fixture in such an arrangement that the wider width side of the inner race comes in contact with the lower fixture. Subsequently, the foregoing fixture is heated so that the lubricant-containing polymer packed in the foregoing space is melted. During this procedure, the foregoing upper fixture is heated, too, but is kept separated from the rolling bearing. Subsequently, after the fusion of the foregoing lubricant-containing polymer, the foregoing upper fixture is placed on the rolling bearing placed on the foregoing lower fixture in such an arrangement that it comes in contact with the wider width side of the foregoing outer race under pressure. Under these conditions, the two fixtures are rapidly cooled so that the foregoing lubricant-containing polymer is solidified.

By thus pressing, force is applied sequentially to the outer race, the rollers and the inner race, assuring that the rollers are rightly positioned. At the same time, the lubricant-containing polymer can spread all over the entire surface of the cage, making it for the lubricant-containing polymer to cover the cage.

On the other hand, if injection molding is used, the following method can be used.

A fixture (mold) similar to the foregoing pair of fixtures, i.e., upper fixture and lower fixture (with the proviso that the upper fixture (mold) comprises a pin gate for injecting material formed therein) is prepared. A rolling bearing to which the foregoing release agent or grease has been applied is disposed between the two fixtures. Subsequently, a lubricant-containing polymer is pressed through the foregoing pin gate into the space formed by the foregoing inner race, outer race, rolling elements and cage. Thereafter, the lubricant-containing polymer thus pressed is cooled and solidified.

The lubricant-containing polymer which has thus been pressed in through the pin gate can spread all over the entire surface of the cage, making it for the lubricant-containing polymer to cover the cage. Further, the employment of injection molding can provide the lubricant-containing polymer with an enhanced strength, making it less likely that the lubricant-containing polymer covering the protrusion of the cage may break.

As the foregoing release agent there can be preferably used a fluorine-based release agent. Specific examples of the fluorine-based release agent employable herein include a mixture of perfluoroalkyl group-containing phosphoric acid ester having from 4 to 20 carbon atoms or salt thereof and silicone oil (as disclosed in JP-B-53-23270 and JP-B-53-23271), mixture of perfluoroalkyl group-containing phosphoric acid having from 4 to 20 carbon atoms or salt thereof and silicone varnish (as disclosed in JP-B-57-48035), mixture of perfluoroalkyl group-containing polyether compound and silicone oil (as disclosed in JP-B-59-32513) and mixture of perfluoroalkyl group-containing urethane compound and ladder polymer of organosil sesquioxane or the like (as disclosed in JP-A-63-104804). These mixtures not containing a silicone compound may be also used. The fluorine-based release agent may be mainly composed of the foregoing compounds and an appropriate solvent (e.g., water, isooctane, HCFC-141b) incorporated therein.

Examples of the grease which can be used for the lubricant-containing polymer-filled rolling bearing having a cage according to the present invention include those described above.

The present invention will be further described in the following examples, but the present invention should not be construed as being limited thereto.

EXAMPLE 1

A resin comprising 10 wt % of a high density polyethylene, 12.5 wt % of an ultrahigh molecular polyethylene and 2.5 wt % of a polyethylene wax and 75 wt % of a mineral oil were mixed to prepare a lubricant-containing polymer.

A self-aligning roller bearing 22331 was degreased and cleaned, dipped in a solution obtained by diluting a grease (ester-based grease, base oil: polyester; thickening agent: lithium soap) with petroleum benzine, withdrawn from the solution, and then allowed to-stand to prepare a grease layer having a thickness of 50 $\mu$m on the surface of the rolling bearing.

Subsequently, with the foregoing bearing held in the mold as shown in FIGS. 4 and 5, the lubricant-containing polymer having the foregoing formulation was injection-molded (insert-molded) to prepare a test bearing. The injection of the lubricant-containing polymer was effected on one side of the bearing. The mold were provided with gates at the positions corresponding to the clearance between the various rollers (pin point gate). As the injection molding machine there was used one (with remodeled hopper portion) described in JP-A-8-309793.

EXAMPLE 2

A test bearing was prepared in the same manner as in Example 1 except that as the covering grease there was used a silicon based grease (base oil: phenylmethyl polysiloxane; thickening agent: lithium soap).

EXAMPLE 3

A test bearing was prepared in the same manner as in Example 1 except that as the covering grease there was used a fluorine-based grease (base oil: perfluoropolyether; thickening agent: PTFE).

EXAMPLE 4

A test bearing was prepared in the same manner as in Example 1 except that as the covering grease there was used a mineral oil-based grease (thickening agent: lithium soap).

Comparative Example 1

A test bearing was prepared in the same manner as in Example 1 except that a mineral oil was used instead of the grease. The mineral oil layer had a thickness of 3 $\mu$m.

Rotary Test

The foregoing various test bearings were each subjected to rotation under a load Fr of 500 kgf. The rotary speed was stepwise raised from 600 rpm by 100 rpm. Each of these rotary speeds was held for 24 hours. Under these conditions, the rotary speed at which the lubricant-containing polymer undergoes break such as cracking was then examined. The results are set forth in Table 1.

TABLE 1

| Test bearing | Rotary speed at which break occurs [rpm] |
|---|---|
| Example 1 | 2,000 |
| Example 2 | 1,600 |
| Example 3 | 1,700 |
| Example 4 | 1,900 |
| Comparative Example 1 | 1,000 |

As can be seen in Table 1, the test bearings of Examples 1 to 4 on which a grease layer were formed suffer from a reduced temperature rise due to the rotation of the shaft as compared with the test bearing of Comparative Example 1 coated with a mineral oil. As a result, the test bearings of Examples 1 to 4 allow the lubricant-containing polymer packed therein to withstand breaking stress up to a drastically raised rotary speed.

EXAMPLE 5

As a test bearing there was used an angular contact ball bearing "30TAC62B" for supporting ball screw produced by NSK Ltd. A layer having a thickness of 50 μm and composed of the same grease as used in Example 1 was formed on the surface of the rolling elements. Subsequently, the same lubricant-containing polymer as used in Example 1 was packed into and heat-molded in the bearing using the fixture shown in FIG. 7 to prepare a test bearing.

Comparative Example 2

A test bearing was prepared in the same manner as in Example 5 except that a mineral oil was used instead of the grease. The layer composed of mineral oil had a thickness of 3 μm.

Rotary Test

Three units of each of the test bearings of Example 5 and Comparative Example 2 were mounted on a shaft (DBD combination). Under these conditions, the rotary speed at which the lubricant-containing polymer breaks was examined. Two units (DT combination) of the same kind of bearings in which an ordinary grease had been packed were mounted on the opposite side of the shaft. A load of 500 kgf was internally applied to each of the bearings on a pretension basis. During the testing procedure, the rotary speed was stepwise raised from 600 rpm by 100 rpm. Each of these rotary speeds was held for 24 hours. Under these conditions, the rotary speed at which the lubricant-containing polymer undergoes break such as cracking was then examined. The results are set forth in Table 2.

TABLE 2

| Test bearing | Rotary speed at which break occurs [rpm] |
| --- | --- |
| Example 5 | 2,700 |
| Comparative Example 2 | 1,600 |

As can be seen in Table 2, the formation of a grease layer makes it possible to drastically raise the rotary speed at which break occurs.

EXAMPLE 6

A test bearing was prepared in the same manner as in Example 1 except that the thickness of the grease layer was changed to 10 μm.

EXAMPLE 7

A test bearing was prepared in the same manner as in Example 1 except that the thickness of the grease layer was changed to 1,000 μm.

Comparative Example 3

A test bearing was prepared in the same manner as in Example 1 except that the thickness of the grease layer was changed to 5 μm.

Comparative Example 4

A test bearing was prepared in the same manner as in Example 1 except that the thickness of the grease layer was changed to 1,200 μm.

When injection molding was effected in an attempt to pack the lubricant-containing polymer in the shape as shown in FIG. 2, the lubricant-containing polymer could not fill in the space between the outer end face of the rollers. As a result, the cage was exposed at three points.

Rotary Test

The test bearings of Examples 6 and 7 and Comparative Examples 3 and 4 were subjected to rotary test in the same manner as in Examples 1 to 4 and Comparative Example 1. The results of the rotary test are set forth in Table 3.

TABLE 3

| Results of test | Thickness of grease layer [μm] | Rotary speed at which break occurs [rpm] |
| --- | --- | --- |
| Example 6 | 10 | 1,800 |
| Example 7 | 1,000 | 2,000 |
| Comparative Example 3 | 5 | 1,200 |
| Comparative Example 4 | 1,200 | 700 |

As can be seen in Table 3, when a grease layer is formed to a thickness of from 10 μm to 1,000 μm, good lubrication can be provided. The test bearing of Comparative Example 4 showed a break at a low rotary speed due to malpacking.

As mentioned above, the lubricant-containing polymer-filled rolling bearing according to the present invention comprises a coating layer of a grease formed thereon to a predetermined thickness of from 10 μm to 1,000 μm to have assured improvement in lubricating properties. Further, the use of a grease makes it possible to form a layer to a thickness of as great as about 1,000 μm. In this arrangement, the clearance between the lubricant-containing polymer and the inner and outer races can be raised, thereby further securing smooth rotation.

Embodiments of implication of the lubricant-containing polymer-filled rolling bearing according to the present invention will be described in connection with the attached drawings.

Figure 8:
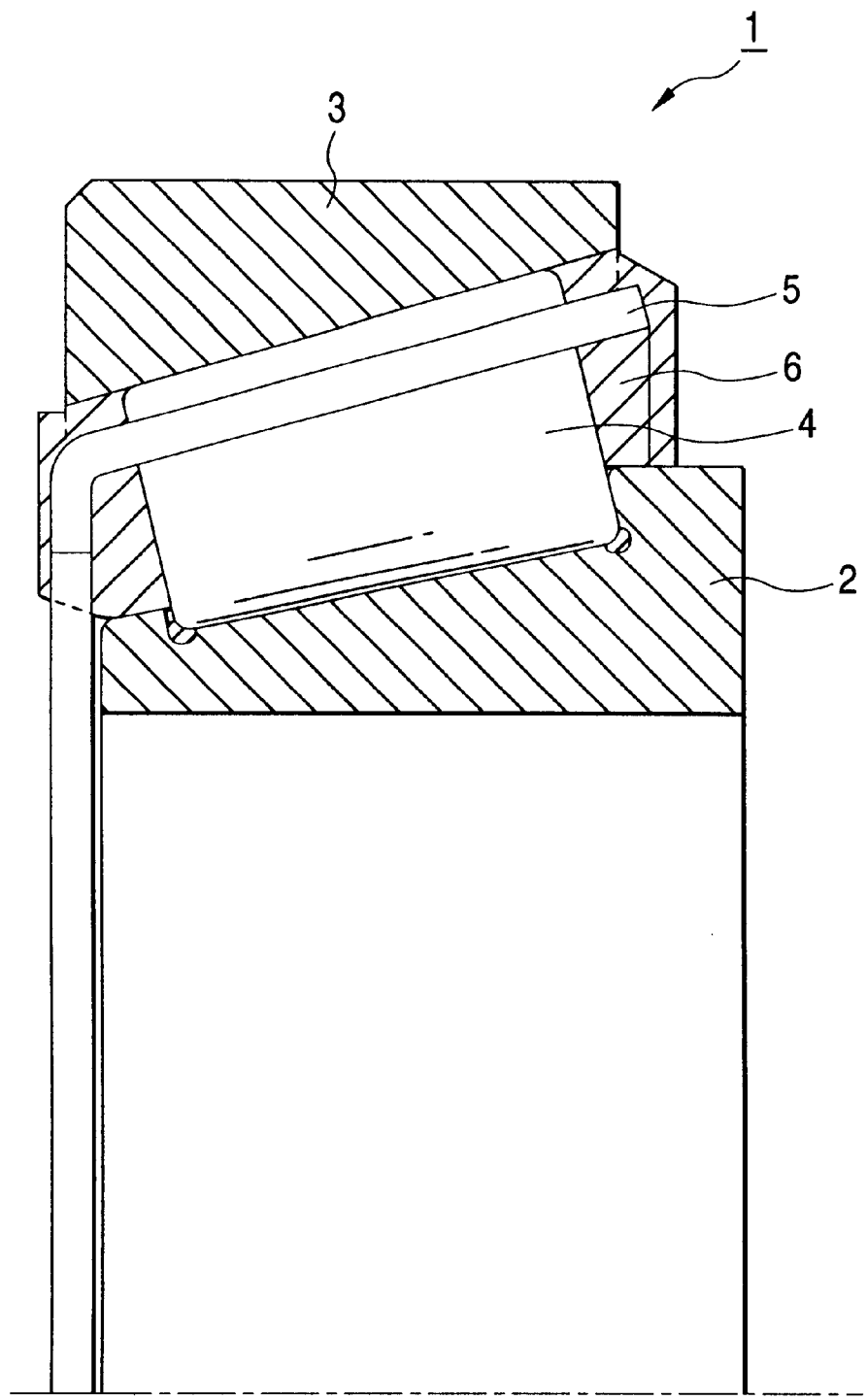
FIG. 8 is a sectional view illustrating a part of the lubricant-containing polymer-filled rolling bearing according to the present invention.
Figure 9:
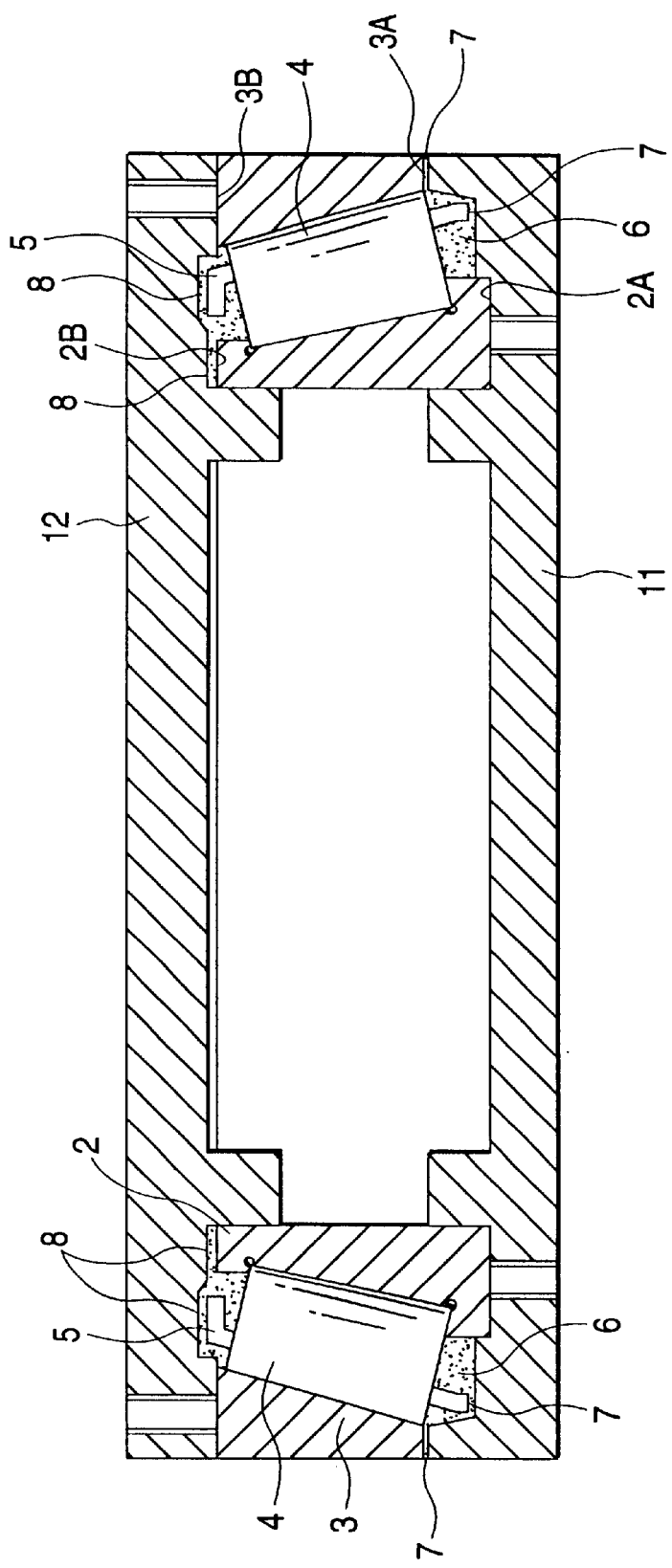
FIG. 9 is a sectional view illustrating a part of the process for producing the lubricant-containing polymer-filled rolling bearing according to the present invention.
Figure 10:
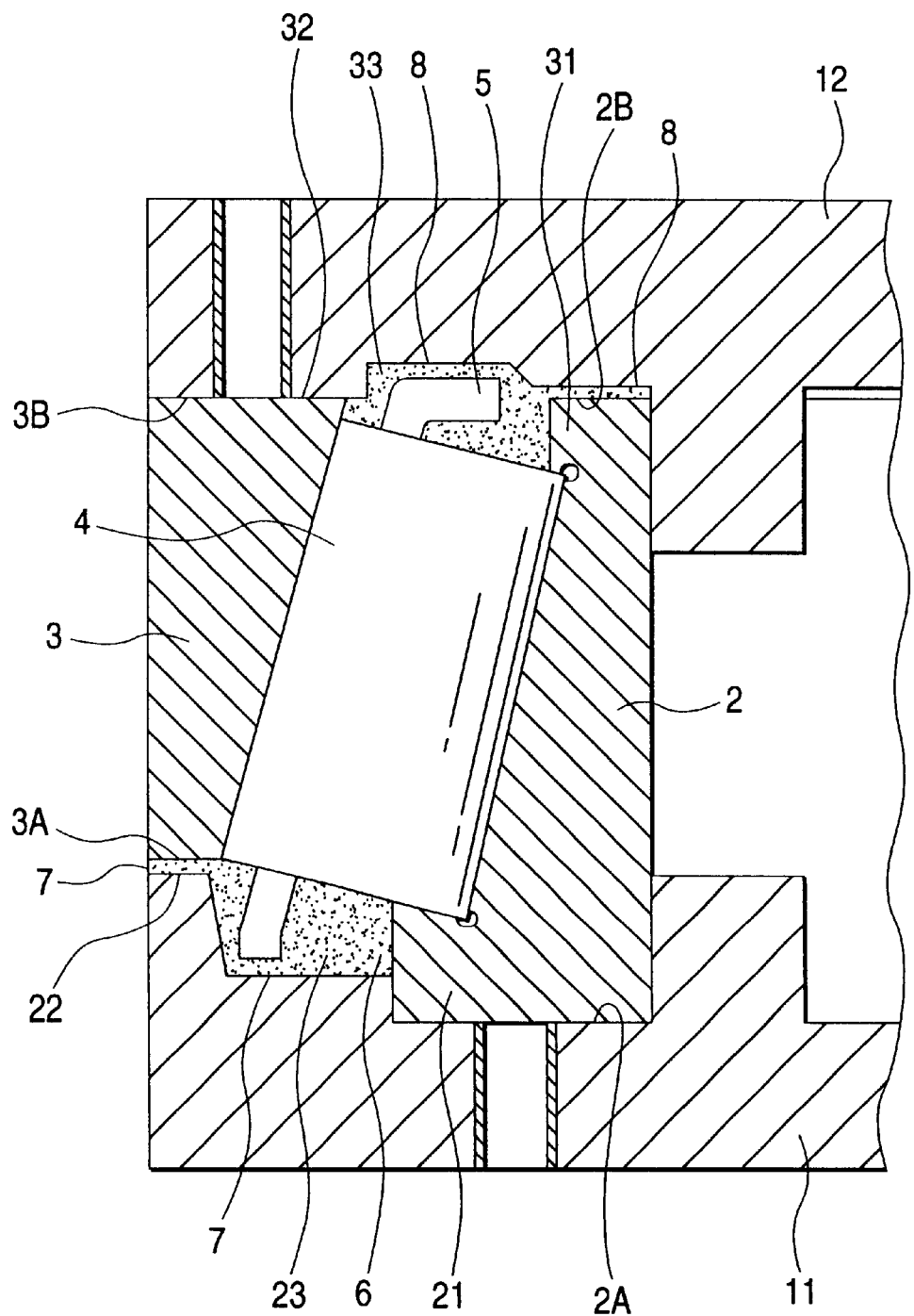
FIG. 10 is an enlarge view of a part of FIG. 9, wherein the reference numeral 1 indicates a lubricant-containing polymer-filled rolling bearing, the reference numeral 2 indicates an inner race, the reference numeral 3 indicates an outer race, the reference numeral 4 indicates a tapered roller bearing (rolling elements), the reference numeral 5 indicates a cage, the reference numeral 6 indicates a lubricant-containing polymer, the reference numeral 11 indicates a lower fixture, and the reference numeral 12 indicates an upper fixture.

FIG. 8 is a-sectional view illustrating a part of an embodiment of the lubricant-containing polymer-filled rolling bearing according to the present invention. FIG. 9 is a sectional view illustrating a part of the process for the production of an embodiment of the lubricant-containing polymer-filled rolling bearing. FIG. 10 is an enlarged view of a part of FIG. 9.

As shown in FIG. 8, a lubricant-containing polymer-filled rolling bearing 1 according to the present invention is a tapered roller bearing comprising an inner race 2, an outer race 3, a plurality of tapered rollers 4 as rolling elements interposed between the inner race 2 and the outer race 3 and a cage 5 retaining the rolling elements 4.

The space formed by the inner race 2, the outer race 3, the tapered rollers 4 and the cage 5 in the tapered roller bearing is filled with a solidified lubricant-containing polymer 6 covering the cage 5.

In the present embodiment, the lubricant-containing polymer 6 having the following formulation was used.

Formulation

| | |
| --- | --- |
| High density polyethylene (classified as relatively low molecular hydrocarbon) | 10 wt % |

-continued

| | |
|---|---|
| ultrahigh molecular polyethylene (classified as ultrahigh molecular hydrocarbon) | 12.5 wt % |
| Polyethylene wax (classified as wax) | 2.5 wt % |
| Mineral oil | 75 wt % |

A process for the production of the lubricant-containing polymer-filled rolling bearing 1 according to the present invention will be described hereinafter.

The fixture used in the present embodiment consists of a lower fixture 11 and an upper fixture 12 as shown in FIGS. 9 and 10.

The lower fixture 11 comprises a concave portion 21 in which the inner race 2 fits at the wider width side thereof and a collar portion 22 facing toward the narrower width side 3A of the outer race 3 on the periphery thereof. Formed between the concave 21 and the collar 22 is a concave 23 for receiving the tapered roller 4 and the cage 5. The lower fixture 11 is arranged such that when the tapered roller bearing is placed thereon, the wider width side face 2A of the inner race 2 comes in contact with the bottom surface of the concave portion 21 and a clearance 7 is formed between the end face 3A of the outer race 3 and the upper surface of the collar portion 22 and between the cage 5 and the collar portion 23.

The upper fixture 12 comprises a concave 31 in which the inner race 3 fits at the narrower width side thereof and a contact portion 32 which comes in contact with the wider width end face 3B of the outer race 3 on the periphery thereof. Formed between the concave 31 and the collar 32 is a concave 33 for receiving the tapered roller 4 and the cage 5. The upper fixture 12 is arranged such that when it is placed on the tapered roller bearing, the wider width side face 3B of the outer race 3 comes in contact with the contact portion 32 and a clearance 8 is formed between the end face 2B of the inner race 2 and the concave portion 31 and between the cage 5 and the concave portion 33.

In order to produce the lubricant-containing polymer-filled rolling bearing 1, a tapered roller bearing is assembled by an ordinary method, and then degreased and cleaned by an ordinary method. Thereafter, a release agent or grease is applied to the outer peripheral surface of the inner race 2, the inner peripheral surface of the outer race 3, the surface of the tapered rollers 4 and the surface of the cage 5 to form a coating layer of a release agent or grease thereon.

The formation of the release agent or grease layer can be accomplished by applying a fluorine-based release agent as it is or diluted with an appropriate diluent (e.g., water, isooctance, gasoline, HCFC-141b) to the foregoing various positions by spraying method or brushing method or dipping the tapered roller bearing in a solvent or dispersion containing the foregoing release agent. The coated amount of the release agent is not specifically limited. In practice, however, the coating solution is preferably uniformly applied to a thickness of from about 0.1 µm to 1.0 µm.

The method for forming the grease layer (coating layer) is not specifically limited. In practice, however, a method may be used which comprises filling the bearing with a small amount of a grease, and then rotating the bearing so that a coating layer of grease is formed on the inner peripheral surface of the outer race, the outer peripheral surface of the inner race, and the surface of the rolling elements and optionally the surface of the cage. Another method comprises dissolving a grease in a solvent capable of dissolving its base oil therein and uniformly dispersing a thickening agent therein in an appropriate concentration, dipping the bearing in the solution, and then drying the bearing to remove the solvent therefrom, thereby forming a grease layer thereon. The thickness of the grease layer is preferably from 10 µm to 1,000 µm.

Subsequently, a paste-like lubricant-containing polymer 6 is packed in the space formed by the outer peripheral surface of the inner race 2, the inner peripheral surface of the outer race 3, the surface of the tapered roller bearing 4 and the surface of the cage 5 on which a coating layer of release agent or grease has been formed.

Subsequently, the tapered roller bearing having the lubricant-containing polymer 6 packed therein is placed in position on the lower fixture 11. Subsequently, the lower fixture 11 is heated to a temperature of about 150° C. in a hot press so that the lubricant-containing polymer 6 is melted. During this procedure, the upper fixture 12 is heated, too, but is kept separated from the tapered roller bearing. This heating causes the lubricant-containing polymer 6 to fill completely the foregoing space and the clearances 7 and 8 Accordingly, even in a rolling bearing arranged such that the inner race and the outer race differ from each other in vertical thickness and the cage protrudes outwardly from either one of the end face of the inner race and the outer race, the lubricant-containing polymer can cover all over the surface of the cage.

After the lubricant-containing polymer 6 is melted, the tapered roller bearing is moved into a cold press together with the lower fixture 11. The upper fixture 12 is then placed on the tapered roller bearing in such an arrangement that the tapered roller bearing comes in contact with the wider width end face 3B of the outer race 3. The tapered roller bearing is then pressed. By thus pressing, force is applied from the upper fixer 12 towards the upper fixture 11, sequentially to the outer race 3, the tapered rollers 4 and the inner race 2, assuring that the tapered rollers are rightly positioned. Under these conditions, the tapered roller bearing was rapidly cooled (see FIG. 9) so that the lubricant-containing polymer 6 was solidified.

Thereafter, the tapered roller bearing is withdrawn from the fixtures, and then optionally subjected to desired finish to obtain a lubricant-containing polymer-filled rolling bearing 1.

The lubricant-containing polymer-filled rolling bearing 1 thus obtained can operate smoothly at a low torque and thus exhibits good lubricating properties.

A method for producing the present embodiment of the lubricant-containing polymer-filled rolling bearing 1 by injection molding will be described hereinafter.

For the injection molding, a mold consisting of a pair of fixtures having the same arrangement as the foregoing arrangement consisting of lower fixture 11 and upper fixture 12 except that a pin gate for injecting material is formed in the upper fixture was used. In the present embodiment, the screw type injection molding machine disclosed in JP-A-8-309793 the hopper portion of which is remodeled was used to effect injection molding.

Firstly, a tapered roller bearing was assembled by an ordinary method. The tapered roller bearing thus assembled was degreased and cleaned by an ordinary method. Subsequently, a release agent or grease was applied to the outer peripheral surface of the inner race 2, the inner peripheral surface of the outer race 3, the surface of the tapered rollers and the surface of the cage 5 in the tapered roller bearing to form a coating layer of release agent or grease thereon.

Subsequently, the tapered roller bearing was placed in position on the lower fixture. The tapered roller bearing was then combined to the upper fixture.

Subsequently, the lubricant-containing polymer 6 was pressed into a hopper of an injection molding machine (not shown), and was then heated to a temperature of not lower than the melting point thereof. The lubricant-containing polymer 6 which had been melted was pressed with a screw and then injected into the space formed by the inner race 2, the outer race 3, the tapered rollers 3 and the cage 5 through the pin gate formed in the upper fixture. During this procedure, the lubricant-containing polymer 6 was injected also into the clearance 8 between the cage 5 and the concave portion 33 and between the end face 2B of the inner race 2 and the concave portion 31. The lubricant-containing polymer 6 was further injected into the clearance 7 formed on the lower fixture. The lubricant-containing polymer 6 thus injected was cooled in the mold close to the mold temperature so that it was solidified.

Thereafter, the tapered roller bearing was withdrawn from the fixtures, and then optionally subjected to desired finish to obtain a lubricant-containing polymer-filled rolling bearing 1.

The lubricant-containing polymer-filled rolling bearing 1 produced by injection molding, too, could smoothly operate and thus exhibited good lubricating properties.

If injection molding is used to produce a lubricant-containing polymer-filled rolling elements according to the present invention, a vertical molding machine comprising two fixtures vertically arranged is preferably used.

As mentioned above, in accordance with the present invention, even in a rolling bearing having a cage protruding from either one of the end face of the inner and outer races, the cage can be evenly covered easily by a lubricant-containing polymer. As a result, even a rolling bearing arranged such that the cage protrudes outwardly from either one of the end face of the inner and outer races, such as tapered roller bearing, can operate with an enhanced reliability under high speed and high load operation conditions.

While the invention has been described in detail and with reference to specific embodiments thereof, it will be apparent to one skilled in the art that various changes and modifications can be made therein without departing from the spirit and scope thereof.

What is claimed is:

1. A lubricant-containing polymer-filled rolling bearing comprising a lubricant-containing polymer packed in the space formed by an outer race, an inner race and rolling elements, wherein said lubricant-containing polymer is packed with the interposition of a grease layer having a thickness of from 10 μm to 1,000 μm formed at least on the inner peripheral surface of said outer race, the outer peripheral surface of said inner race and the surface of said rolling elements, and wherein the grease of the grease layer has low compatibility with the lubricant-containing polymer.

2. The lubricant-containing polymer-filled rolling bearing according to claim 1, wherein the lubricant-containing polymer comprises a polyolefin-based resin and a lubricant, the lubricant is mineral oil, a poly-α-olefin oil, phenylether oil having a long hydrocarbon chain or naphthalene oil having a long hydrocarbon chain, and the grease of the grease layer is fluorine-based grease, silicone grease, fluorosilicone grease, ester grease or polyphenylether-based grease.

3. The lubricant-containing polymer-filled rolling bearing according to claim 1, wherein the lubricant-containing polymer comprises a resin, the resin is a polyester-based elastomer, polyurea elastomer or polyurethane resin, the grease of the grease layer is fluorine-based grease, silicon grease or fluorosilicone grease, the grease comprises a base oil and a thickening agent, the base oil is mineral oil, poly-α-olefin oil, phenylether oil having a long hydrocarbon chain or naphthalene oil having a long hydrocarbon chain, and the thickening agent is urea or lithium soap.

4. A lubricant-containing polymer-filled rolling bearing comprising an inner race, an outer race, a plurality of rolling elements provided interposed between said inner race and said outer race, a cage protruding outwardly from the end face of either said inner race or said outer race and retaining said rolling elements, and a lubricant-containing polymer packed in the space formed by said inner race, said outer race, said rolling elements and said cage, wherein said cage is covered with said lubricant-containing polymer.

5. The lubricant-containing polymer-filled rolling bearing according to claim 4, wherein said rolling elements are tapered rollers.

6. A process for the production of a lubricant-containing polymer-filled rolling bearing, which comprises assembling a rolling bearing, forming a grease layer having a thickness of from 10 μm to 1,000 μm on at least the inner peripheral surface of an outer race, the outer peripheral surface of an inner race and the surface of rolling elements, filling the space formed by said outer race, said inner race and said rolling elements with a lubricant-containing polymer, and then allowing said lubricant-containing polymer to solidify, wherein the grease of the grease layer has low compatibility with the lubricant-containing polymer.

7. The process for the production of a lubricant-containing polymer-filled rolling bearing according to claim 6, wherein the lubricant-containing polymer comprises a polyolefin-based resin and a lubricant, the lubricant is mineral oil, a poly-α-olefin oil, phenylether oil having a long hydrocarbon chain or naphthalene oil having a long hydrocarbon chain, and the grease of the great layer is fluorine-based grease, silicone grease, fluorosilicone grease, ester grease or polyphenylether-based grease.

8. The process for the production of a lubricant-containing polymer-filled rolling bearing according to claim 6, wherein the lubricant-containing polymer comprises a resin, the resin is a polyester-based elastomer, polyurea elastomer or polyurethane resin, the grease of the grease layer is fluorine-based grease, silicon grease or fluorosilicone grease, the grease comprises a base oil and a thickening agent, the base oil is mineral oil, poly-α-olefin oil, phenylether oil having a long hydrocarbon chain or naphthalene oil having a long hydrocarbon chain, and the thickening agent is urea or lithium soap.

9. A process for the production of a lubricant-containing polymer-filled rolling bearing comprising an inner race, an outer race, a plurality of rolling elements provided interposed between said inner race and said outer race, a cage protruding outwardly from the end face of either said inner race or said outer race and retaining said rolling elements, and a lubricant-containing polymer packed in the space formed by said inner race, said outer race, said rolling elements and said cage, which comprises steps of:

assembling a rolling bearing;

applying a release agent or grease to the outer peripheral surface of said inner race, the inner peripheral surface of said outer race, the surface of said rolling elements and the surface of said cage;

placing said rolling bearing to which a release agent or grease has been applied between a lower fixture arranged such that it comes in contact with the wider end face of said inner race but does not come in contact with the narrower end face of said outer race and said cage and an upper fixture arranged such that it comes in contact with the wider end face of said outer race but does not come in contact with the narrower end face of said inner race and said cage; and solidifying said lubricant-containing polymer in the space formed by said inner race, said outer race, said rolling elements and said cage.

* * * * *